United States Patent
Cho et al.

(10) Patent No.: US 11,150,002 B2
(45) Date of Patent: Oct. 19, 2021

(54) REFRIGERATOR AND METHOD FOR CONTROLLING A MOTOR DRIVING A COMPRESSOR OF THE REFRIGERATOR

(71) Applicant: Samsung Electronics Co., Ltd., Suwon-si (KR)

(72) Inventors: Jaepil Cho, Suwon-si (KR); Sungbok Ko, Suwon-si (KR); Joohee Song, Suwon-si (KR); Jongeon Si, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/721,169

(22) Filed: Dec. 19, 2019

(65) Prior Publication Data

US 2020/0208894 A1 Jul. 2, 2020

(30) Foreign Application Priority Data

Dec. 27, 2018 (KR) .......................... 10-2018-0170217

(51) Int. Cl.
 *F25D 29/00* (2006.01)
 *F25B 49/02* (2006.01)
(52) U.S. Cl.
 CPC ............ *F25B 49/025* (2013.01); *F25D 29/00* (2013.01); *F25B 2600/0253* (2013.01); *F25B 2700/17* (2013.01); *F25D 2700/12* (2013.01)
(58) Field of Classification Search
 CPC ............ F25B 49/025; F25B 2600/0253; F25D 29/00; F25D 2700/12
 See application file for complete search history.

(56) References Cited

U.S. PATENT DOCUMENTS

| | | | |
|---|---|---|---|
| 8,011,199 B1 * | 9/2011 | Chen | F24F 11/77 |
| | | | 62/228.5 |
| 2017/0219277 A1 | 8/2017 | Ryu et al. | |

FOREIGN PATENT DOCUMENTS

| | | |
|---|---|---|
| JP | 4564947 | 8/2010 |
| JP | 2014-234718 | 12/2014 |
| KR | 10-1999-0010015 | 2/1999 |
| KR | 10-1999-0053004 | 7/1999 |
| KR | 2000-0055338 | 9/2000 |
| KR | 10-2014-0016543 | 2/2014 |
| KR | 10-2014-0144020 | 12/2014 |
| KR | 10-2015-0074247 | 7/2015 |

OTHER PUBLICATIONS

International Search Report and Written Opinion of the International Searching Authority dated Apr. 17, 2020 in International Patent Application No. PCT/KR2019/017854.

* cited by examiner

*Primary Examiner* — Jonathan Bradford
(74) *Attorney, Agent, or Firm* — Staas & Halsey, LLP

(57) ABSTRACT

Disclosed is a method for controlling a refrigerator including a motor driving a compressor. The method for controlling a refrigerator includes: identifying driving revolutions per minute (RPM) for driving of the motor; performing a control of temperature in the refrigerator based on the identified driving RPM; and storing operation information of the motor associated with the performing of the control of temperature, where the identifying of the driving RPM involves identifying stored operation information of the motor associated with a previous motor driving process.

12 Claims, 7 Drawing Sheets

REFRIGERATOR AND METHOD FOR CONTROLLING A MOTOR DRIVING A COMPRESSOR OF THE REFRIGERATOR

CROSS-REFERENCE TO RELATED APPLICATION(S)

This application is based on and claims priority under 35 U.S.C. § 119 to Korean Patent Application No. 10-2018-0170217, filed on Dec. 27, 2018, in the Korean Intellectual Property Office, the disclosure of which is incorporated by reference herein in its entirety.

BACKGROUND

Field

Apparatuses and methods consistent with the disclosure relate to a refrigerator and a method for controlling the same, and more particularly, to a refrigerator and a method for controlling the same, in which an initial driving speed in a subsequent operation of a motor of the refrigerator is determined by using a driving speed in a previous operation of the motor.

Description of the Related Art

A refrigerator is an electronic apparatus (or a home appliance) capable of refrigerating or freezing edible foods by a refrigeration cycle using a refrigerant. The refrigerator may store medicines, alcoholic liquor, or cosmetics, in addition to foods.

Recently, a method in which a motor of a compressor is operated at low revolutions per minute (RPM) for energy saving of the refrigerator has been applied. However, cooling is sometimes delayed due to a cooling performance level that is not high enough under some conditions such as an increase in ambient temperature of the refrigerator.

According to the related art, once a delay of cooling is identified, RPM of the motor is increased to raise the cooling performance level. However, the motor is operated at low RPM again in a subsequent operation after the operation of the motor ends. Therefore, in case that the increased ambient temperature of the refrigerator is maintained, a situation in which the cooling is delayed repeatedly occurs, which is problematic.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a refrigerator and a method for controlling the same, in which an initial driving speed in a subsequent operation of a motor of the refrigerator is determined by using a driving speed in a previous operation of the motor.

According to an embodiment of the disclosure, a method for controlling a refrigerator including a motor driving a compressor includes: identifying initial driving revolutions per minute (RPM) for driving of the motor; performing a control of temperature in the refrigerator based on the identified initial driving RPM; and storing operation information of the motor in a process of the control of temperature, wherein the identifying comprises, identifying the initial driving RPM based on the operation information of the motor stored in a previous motor driving process.

According to another embodiment of the disclosure, a refrigerator includes: a temperature sensor configured to sense a temperature in the refrigerator; a compressor configured to compress a refrigerant; a motor configured to drive the compressor; a memory configured to store operation information of the motor; and a processor configured to identify initial driving RPM for driving of the motor, perform the control of temperature in the refrigerator based on the identified initial driving RPM, and store the operation information of the motor in a process of the control of temperature in the memory, wherein the processor is configured to identify the initial driving RPM based on the operation information of the motor stored in a previous motor driving process.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other embodiments of the disclosure will be more apparent by describing certain embodiments of the disclosure with reference to the accompanying drawings, in which.

DETAILED DESCRIPTION

Figure 1:
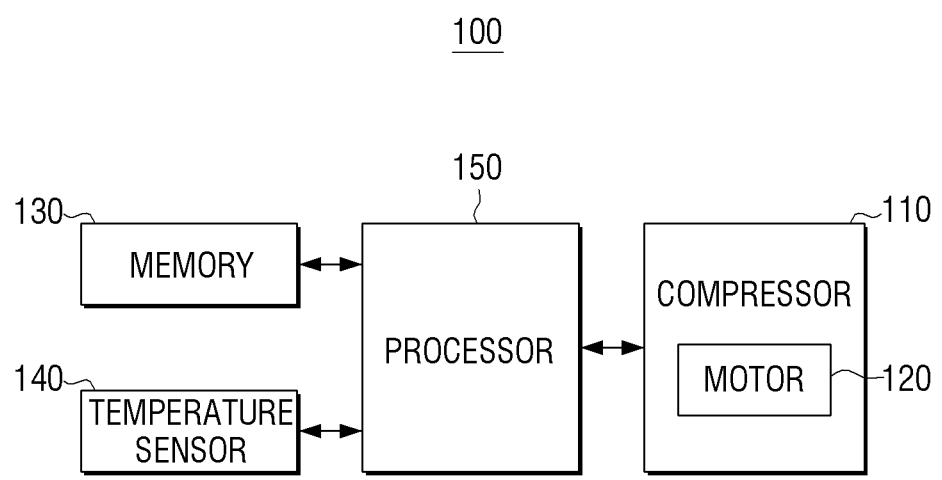
FIG. 1 is a block diagram for describing a schematic configuration of a refrigerator according to an embodiment of the disclosure.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined based on the meaning of the terms and the contents throughout the disclosure rather than simple names of the terms.

Because the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. In a case where it is decided that a detailed description for the known art related to the disclosure may obscure the gist of the disclosure, the detailed description will be omitted.

Terms "first", "second", and the like, may be used to describe various components, but the components are not to be construed as being limited by these terms. The terms are used only to distinguish one component from another component.

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. To clearly describe the disclosure, portions irrelevant to the description are omitted in the drawings.

Hereinafter, the disclosure will be described in more detail with reference to the drawings.

FIG. 1 is a block diagram for describing a schematic configuration of a refrigerator according to an embodiment of the disclosure.

Referring to FIG. 1, a refrigerator 100 includes a compressor 110, a motor 120, a memory 130, a temperature sensor 140, and a processor 150.

The compressor 110 compresses a refrigerant to change the refrigerant into a high-temperature and high-pressure gas. As the refrigerant to be compressed, Freon (chlorofluorocarbons (CFC)), hydro-chlorofluorocarbons (HCFC), hydrofluorocarbons (HFC), or the like may be used. However, the refrigerant is not limited thereto, and various types of materials that may be selected by a manufacturer may be used as the refrigerant.

The compressor 110 may include the motor 120, and the refrigerant may be sucked into the compressor 110 as the motor 120 rotates. The sucked refrigerant is circulated through the compressor 110, a condenser (not illustrated), a capillary tube (not illustrated), and a heat exchanger (not illustrated) to form a refrigeration cycle. Therefore, a circulation speed of the refrigerant may be determined depending on a driving speed of the motor 120 in the compressor 110, and a degree of cooling of the refrigerator 100 may be determined depending on the circulation speed of the refrigerant.

Such a compressor 110 may be a fixed-speed compressor with a fixed number of rotations, or an inverter compressor with a variable number of rotations. Hereinafter, a description will be provided under the assumption that the compressor 110 is an inverter compressor for convenience of explanation.

The motor 120 may be included in the compressor 110 and rotate at various driving speeds according to a control of the processor 150. The driving speed of the motor 120 may be expressed in a unit of revolutions per minute (RPM).

Further, an operation of the motor 120 may be started according to a control of the processor 150 at a point in time at which driving is required, and once a temperature in the refrigerator 100 reaches a target temperature, the operation of the motor 120 may end according to a control of the processor 150. Further, a process from the start of the operation of the motor 120 to the end of the operation of the motor 120 may be expressed as one cycle. The motor 120 may perform the operation for a plurality of cycles according to a control of the processor 150.

Here, the point in time at which driving of the motor 120 is required indicates a point in time at which cooling air is to be injected into the refrigerator 100 by driving the motor 120 to allow the temperature in the refrigerator 100 to be kept at the target temperature.

Specifically, the point in time at which driving is required may be a point in time at which the temperature in the refrigerator 100 reaches a predetermined temperature. Once the temperature in the refrigerator 100 reaches the predetermined temperature, it is determined that the temperature in the refrigerator 100 is increased and injection of cooling air into the refrigerator 100 is required. For example, the predetermined temperature may be a temperature 1° C. higher than a temperature set by a user, and in this case, the point in time at which driving is required may be a point in time at which the temperature in the refrigerator 100 reaches the temperature 1° C. higher than the set temperature.

Further, the point in time at which driving of the motor 120 is required may correspond to a point in time at which a predetermined period elapses after a previous cycle of the motor 120 ends. Here, the predetermined period means a time estimated to be required for the temperature in the refrigerator 100 to be increased to reach a temperature that requires the injection of cooling air into the refrigerator 100, after the operation of the motor 120 ends. For example, the predetermined period may be 10 minutes, and in this case, the point in time at which driving of the motor 120 is required may be a point in time at which 10 minutes elapse after the previous cycle of the motor 120 ends.

The memory 130 stores various data for a general operation of the refrigerator 100, such as a program for processing or a control performed by the processor 150. Specifically, the memory 130 may store multiple application programs run in the refrigerator 100, and data and instructions for the operation of the refrigerator 100.

The memory 130 is accessed by the processor 150, and readout, recording, correction, deletion, update, and the like, of data in the memory 130 may be performed by the processor 150. The memory 130 may be implemented by an external storage medium such as a removable disk such as a universal serial bus (USB), or a web server through a network, as well as a storage medium in the refrigerator 100.

The memory 130 may store a speed control table of the motor 120. Here, the speed control table means a table with information regarding a driving speed of the motor 120 based on time to support a cooling function of the refrigerator 100.

Specifically, the speed control table may include information regarding a driving speed determined based on at least one of information including a setting temperature set by the user, the temperature in the refrigerator 100, and the ambient temperature of the refrigerator 100. Further, the driving speed determined based on the information described above may correspond to low RPM determined in consideration of energy saving.

Therefore, the processor 150 may control the motor 120 to be driven at a driving speed appropriate for the given situation by using the speed control table stored in the memory 130, thereby implementing energy saving.

Further, the speed control table of the motor 120 may include information regarding an appropriate operation time corresponding to each driving speed. Here, the appropriate operation time means a time estimated to be required for the temperature in the refrigerator 100 to reach the target temperature in case that the motor 120 is operated at a specific driving speed. For example, in case that the appropriate operation time corresponding to 2000 RPM is 10 minutes, it may be estimated that the temperature in the refrigerator 100 will reach the target temperature within 10 minutes in case that the motor 120 is operated at 2000 RPM.

Further, the memory 130 may store operation information of the motor 120. Specifically, the memory 130 may store operation information of the motor 120 of each of the plurality of cycles. Here, the operation information may include information regarding the driving speed of the motor 120 in each cycle and a time for which the motor 120 is operated at the driving speed, and other additional information.

For example, in case that the motor 120 is operated at a driving speed of 2000 RPM for 10 minutes in any cycle, the memory 130 may store information including 2000 RPM and 10 minutes.

As another example, in case that the motor 120 is operated at a driving speed of 2000 RPM for 7 minutes and operated at an increased driving speed of 2400 RPM for 3 minutes in any cycle, the memory 130 may store information including 2000 RPM and 7 minutes and information including 2400 RPM and 3 minutes.

The temperature sensor 140 may sense the temperature in the refrigerator 100. Specifically, the temperature sensor 140 may sense a temperature in a storage 160 of the refrigerator 100. Further, in case that the temperature sensor 140 is disposed outside the refrigerator 100, the temperature sensor 140 may sense the ambient temperature of the refrigerator 100. The number of temperature sensors 140 may be plural.

The temperature sensor 140 may provide information regarding the sensed temperature to the processor 150. The processor 150 may identify the temperature in the refrigerator 100 or the ambient temperature of the refrigerator 100 based on the received temperature information, and may control the operation of the motor 120 based on the checked temperature.

The processor 150 may control the respective components in the refrigerator 100. Specifically, in case that a command for a specific function is received, the processor 150 may control an operation of a component related to performing the corresponding function. For example, in case that a user command to lower the setting temperature is received, the processor 150 may control the compressor 110 and the motor 120 to perform the cooling function.

Further, the processor 150 may control the motor 120 to be basically operated at low RPM at the time of performing the cooling function to save energy. However, in case that the ambient temperature of the refrigerator 100 is increased, a cooling delay situation, in which the temperature in the refrigerator 100 may not reach the target temperature for a long time due to an insufficient cooling performance level resulting from the operation of the motor 120 at low RPM, may occur.

Therefore, the processor 150 may control the motor 120 to increase the driving speed, thereby increasing the cooling performance level. Further, the processor 150 may end the operation of the motor 120 once the temperature in the refrigerator 100 reaches the target temperature. As such, one cycle of the motor 120 may be performed according to a control of the processor 150.

According to the related prior art, the processor 150 may control the motor 120 to be operated at low RPM at the time of driving the motor 120 again to perform the cooling function due to the increased temperature in the refrigerator 100 after the operation of the motor ends.

However, in case that the increased ambient temperature of the refrigerator 100 is maintained, the cooling delay situation may occur again due to the operation of the motor 120 at low RPM.

That is, according to the related prior art, an initial driving speed of the motor is fixed to a driving speed V1 corresponding to low RPM, and as a result, the cooling delay situation repeatedly occurs, which is problematic.

In this regard, hereinafter, a method for determining a driving speed of the motor in a subsequent cycle by using operation information of the motor of a previous cycle to solve the above-described problem will be described.

The processor 150 may determine whether to control the motor 120 to be operated at low RPM in the subsequent cycle based on a driving speed of the motor 120 in the previous cycle to save energy, or to control the motor 120 to be operated at a driving speed higher than low RPM in the subsequent cycle to prevent the cooling delay situation. A specific operation therefor will be provided below.

First, the processor 150 may identify whether or not a current point in time is a point in time at which driving of the motor 120 is required. Here, the point in time at which driving of the motor 120 is required indicates a point in time at which cooling air is injected into the refrigerator 100 by driving the motor 120 to allow the temperature in the refrigerator 100 to be kept at the target temperature as described above, and may correspond to at least one of an event in which the temperature in the refrigerator 100 reaches a predetermined temperature or an event in which a predetermined period elapses after the previous cycle of the motor 120 ends.

Then, in case that it is identified that the current point in time is the point in time at which driving of the motor 120 is required, the processor 150 may determine an initial driving speed for driving of the motor 120. Specifically, the processor 150 may determine the initial driving speed based on operation information of the motor 120 in the previous cycle that is stored in the memory 130.

More specifically, the processor 150 may determine an initial driving speed in the subsequent cycle depending on whether or not the cooling delay situation occurs in the previous cycle, based on the operation information of the motor 120 in the previous cycle. Here, whether or not the cooling delay situation occurs may be identified based on whether or not the temperature in the refrigerator 100 reaches the target temperature within an appropriate operation time corresponding to a specific driving speed in case that the motor 120 is operated at the specific driving speed in the previous cycle.

In case that the motor 120 is operated in the specific driving speed in the previous cycle, but the cooling delay situation does not occur, a driving speed corresponding to low RPM or a driving speed lower than the driving speed in the previous cycle may be determined as the driving speed of the motor 120 in the subsequent cycle to save energy.

For example, in case that the motor 120 is operated at the driving speed V1 corresponding to low RPM in the previous cycle and the temperature in the refrigerator 100 reaches the target temperature within an appropriate operation time corresponding to the driving speed V1, the processor 150 may identify that the cooling delay situation does not occur, and determine the driving speed V1 corresponding to low RPM as the initial driving speed in the subsequent cycle.

As another example, in case that the motor 120 is operated at a driving speed V2 higher than the driving speed V1 corresponding to low RPM in the previous cycle and the temperature in the refrigerator 100 reaches the target temperature within an appropriate operation time corresponding to the driving speed V2, the processor 150 may identify that the cooling delay situation does not occur, and determine the driving speed V1 corresponding to low RPM as the initial driving speed in the subsequent cycle again to save energy.

As still another example, in case that the motor 120 is operated at a driving speed V3 higher than the driving speed V2 in the previous cycle and the temperature in the refrigerator 100 reaches the target temperature within an appropriate operation time corresponding to the driving speed V3, the processor 150 may identify that the cooling delay situation does not occur, and determine the driving speed V2 as the initial driving speed in the subsequent cycle to save energy.

That is, when the cooling delay situation does not occur during the operation in the previous cycle, the processor 150 may determine the driving speed corresponding to low RPM as the driving speed of the subsequent cycle in case that the driving speed in the previous cycle is the driving speed corresponding to low RPM, and the processor 150 may determine a driving speed lower than the driving speed in the previous cycle as the driving speed in the subsequent cycle in case that the driving speed in the previous cycle is the driving speed higher than the driving speed corresponding to low RPM.

On the contrary, in case that the motor 120 is operated at the specific operation speed in the previous cycle, but the cooling delay situation occurs, the latest set driving speed, rather than the driving speed corresponding to low RPM, may be determined as the driving speed of the motor 120 in the subsequent cycle to prevent the cooling delay situation from occurring again due to the operation of the motor 120 at low RPM.

For example, in case that the driving speed of the motor 120 is increased to the driving speed V2 higher than the driving speed V1 because the motor 120 is operated at the driving speed V1 corresponding to low RPM in the previous cycle, but the temperature in the refrigerator 100 does not reach the target temperature within the appropriate operation time corresponding to the driving speed V1, the processor 150 may determine the driving speed V2 as the initial driving speed in the subsequent cycle to prevent the cooling delay situation from occurring again.

As another example, in case that the motor 120 is operated sequentially at the driving speed V1 corresponding to low RPM, at the driving speed V2 higher than the driving speed V1, and the driving speed V3 higher than the driving speed V2 in the previous cycle, because the temperature in the refrigerator 100 does not reach the target temperature within the appropriate operation time corresponding to each of the driving speed V1 and the driving speed V2, the processor 150 may determine the driving speed V3 as the initial driving speed in the subsequent cycle again to prevent the cooling delay situation from occurring again.

As still another example, in case that the motor 120 is operated at the driving speed V2 higher than the driving speed V1 corresponding to low RPM in the previous cycle and the operation of the motor 120 at the driving speed V2 is continued and ends in a state in which the temperature in the refrigerator 100 does not reach the target temperature within the appropriate operation time corresponding to the driving speed V2, the processor 150 may determine the driving speed V2 as the initial driving speed in the subsequent cycle because it is estimated that the cooling delay situation occurs again in case that the motor 120 is operated at the driving speed V1 corresponding to low RPM to save energy.

That is, in case that the cooling delay situation occurs during the operation in the previous cycle, the processor 150 may determine the latest set driving speed in the previous cycle as the initial driving speed in the subsequent cycle.

Here, the driving speed V1 corresponding to low RPM may be set based on at least one of the temperature in the refrigerator 100, the ambient temperature of the refrigerator 100, or the user command.

Meanwhile, a specific example of the operation in which the processor 150 determines the initial driving speed based on the operation information of the motor 120 in the previous cycle as described above will be described later with reference to FIGS. 3 and 4.

Further, the operation in which the processor 150 determines the initial driving speed based on the operation information of the motor 120 in the previous cycle is not limited to the example described above, and another example thereof will be described later with reference to FIGS. 5 and 6.

The processor 150 may control the temperature in the refrigerator 100 by using the determined initial driving speed. Specifically, the processor 150 may control the motor 120 to be operated at the determined initial driving speed to inject the cooling air into the refrigerator 100, thereby controlling the temperature in the refrigerator 100.

Further, in case that the motor 120 is operated at the determined initial driving speed, but the temperature in the refrigerator 100 is not controlled within the appropriate operation time corresponding to the initial driving speed, the processor 150 may increase the driving speed of the motor 120.

For example, in case that the determined initial driving speed is a first driving speed (e.g., 2000 RPM) and the motor 120 is operated at the first driving speed, but the temperature in the refrigerator 100 does not reach the target temperature within an appropriate operation time (e.g., 10 minutes) corresponding to the first driving speed, the processor 150 may increase the driving speed of the motor 120 to a second driving speed (e.g., 2400 RPM) higher than the first driving speed.

Further, in case that the motor 120 is operated at the increased driving speed, but the temperature in the refrigerator 100 still does not reach the target temperature within an appropriate operation time corresponding to the increased driving speed, the processor 150 may increase the driving speed of the motor 120 again.

For example, in case that the determined initial driving speed is the first driving speed (e.g., 2000 RPM) and the motor 120 is operated at the first driving speed, but the temperature in the refrigerator 100 does not reach the target temperature within an appropriate operation time (e.g., 10 minutes) corresponding to the first driving speed, the processor 150 may increase the driving speed of the motor 120 to the second driving speed (e.g., 2400 RPM). Further, in case that the motor 120 is operated at the second driving speed, but the temperature in the refrigerator 100 does not reach the target temperature within an appropriate operation time (e.g., 7 minutes) corresponding to the second driving speed, the processor 150 may increase the driving speed of the motor 120 again.

The processor 150 may end the operation of the motor 120 once the temperature in the refrigerator 100 reaches the target temperature.

Further, the processor 150 may store operation information of the motor 120 in a process of controlling the temperature. Specifically, the processor 150 may store information regarding a driving speed of the motor 120 in each cycle in the temperature control process. Further, the operation information of the motor 120 may further include information regarding a time for which the motor 120 is operated at each driving speed.

Meanwhile, although the case that the memory stores the speed control table and the operation information of the motor has been illustrated in FIG. 1 and described, the case that the processor stores the speed control table and the operation information of the motor may also be implemented.

Further, although only the simple components of the refrigerator are illustrated and described hereinabove, but various components may be further included in the refrigerator at the time of actually implementing the refrigerator. Those will be described below with reference to FIG. 2.

Figure 2:
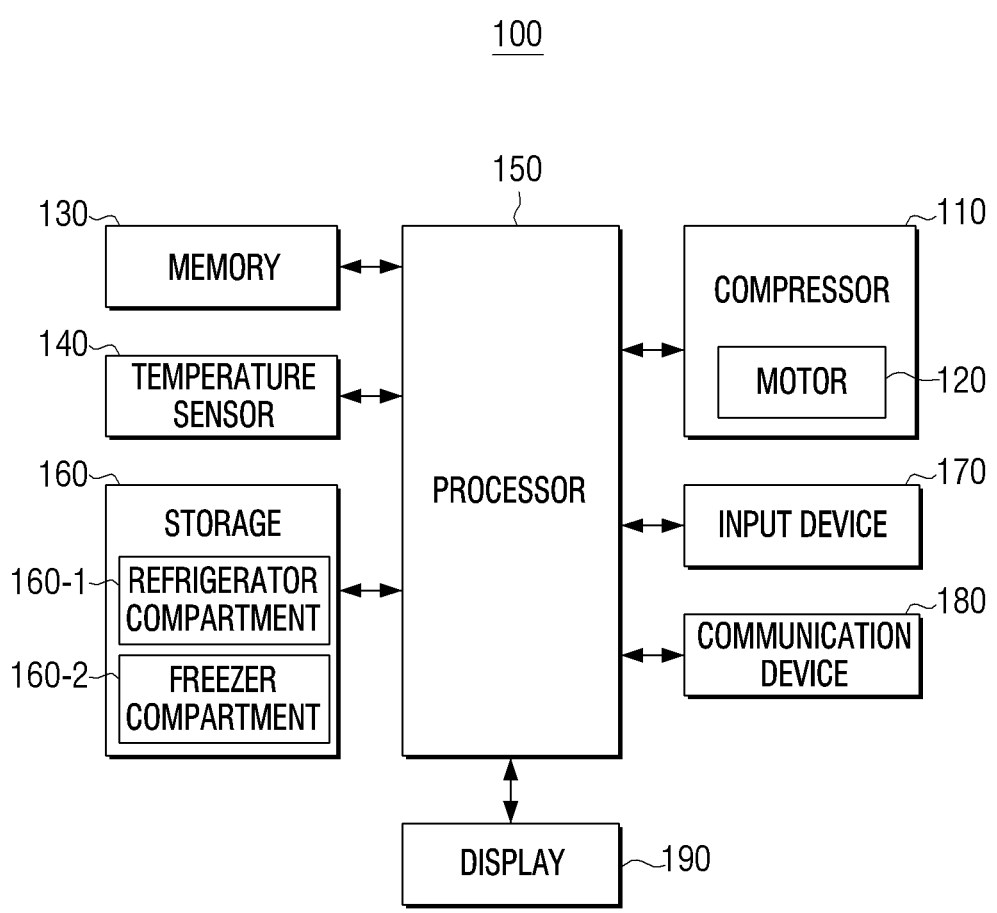
FIG. 2 is a block diagram illustrating a specific configuration of the refrigerator according to an embodiment of the disclosure.

FIG. 2 is a block diagram illustrating a specific configuration of the refrigerator according to an embodiment of the disclosure.

Referring to FIG. 2, the refrigerator 100 according to an embodiment of the disclosure may include the compressor 110, the motor 120, the memory 130, the temperature sensor 140, the processor 150, the storage 160, an input device 170, a communication device 180, and a display 190.

The compressor 110, the motor 120, the memory 130, the temperature sensor 140, and the processor 150 have the same functions as those illustrated in FIG. 1 and thus an overlapping description thereof will be omitted.

The storage 160 is a place which is disposed in the refrigerator 100 and in which foods may be stored. The storage 160 may include at least one of a refrigerator compartment 160-1 which is kept at about 0 to 5° C. and in which foods may be refrigerated or a freezer compartment 160-2 which is kept at about −30 to 0° C. and in which foods may be frozen.

The storage 160 may have a front surface that is open to put or take out foods into or from the storage 160, and the open front surface may be opened and closed by a door (not illustrated). A shelf or the like on which foods may be put may be disposed in the storage 160.

Further, in case that the storage 160 includes both the refrigerator compartment 160-1 and the freezer compartment 160-2, the refrigerator compartment 160-1 and the freezer compartment 160-2 need to be kept at different temperatures, respectively, and thus the temperature sensor 140 may be provided in each of the refrigerator compartment 160-1 and the freezer compartment 160-2. In addition, a plurality of compressors 110 supplying the cooling air to each of the refrigerator compartment 160-1 and the freezer compartment 160-2 may be provided.

The processor 150 may receive temperature information from the temperature sensor 140 provided in each of the refrigerator compartment 160-1 and the freezer compartment 160-2 and control the compressor 110 or the like to allow the refrigerator compartment 160-1 and the freezer compartment 160-2 to be kept at an appropriate temperature.

The input device 170 may include multiple functional keys which allow the user to set or select various functions supported in the refrigerator 100. The user may input various driving commands for the refrigerator 100 through the input device 170. For example, the user may input a command relating to a cooling level of the refrigerator through the input device 170.

The communication device 180 is connected to an external device (not illustrated) and may transmit and receive various data to and from the external device. Specifically, the communication device 180 may be connected to the external device through a local area network (LAN) and the Internet network or be connected to the external device through a universal serial bus (USB) port or a wireless communication (for example, wireless fidelity (Wi-Fi), 802.11a/b/g/n, near field communication (NFC), or Bluetooth) port. Here, the external device may be a personal computer (PC), a notebook computer, a smartphone, a server, or the like.

The display 190 may display various information provided from the refrigerator 100. Specifically, the display 190 may display an operation state of the refrigerator 100 or display a user interface window for selection of functions and options by the user. Further, the display 190 may be implemented in a form of a touch screen that may also perform the function of the input device 170.

According to the related art, a method in which the motor of the compressor is operated at low RPM to save energy, and in case that the temperature in the refrigerator continuously does not reach the target temperature due to an increase in the ambient temperature of the refrigerator, the RPM is increased to increase the cooling performance level. In this case, however, the motor is operated at low RPM again at the time of restarting the operation of the motor after the operation of the motor ends, and thus the cooling delay situation occurs again in case that the increased ambient temperature of the refrigerator is maintained.

On the contrary, the refrigerator according to the embodiment identifies whether or not the cooling delay situation occurs in the previous cycle by using the operation information of the motor in the previous cycle of the motor, and determines the driving speed in the subsequent cycle according to the identification result as described above, and thus it is possible to achieve both an effect of saving energy and an effect of preventing the cooling delay situation.

Figure 3:
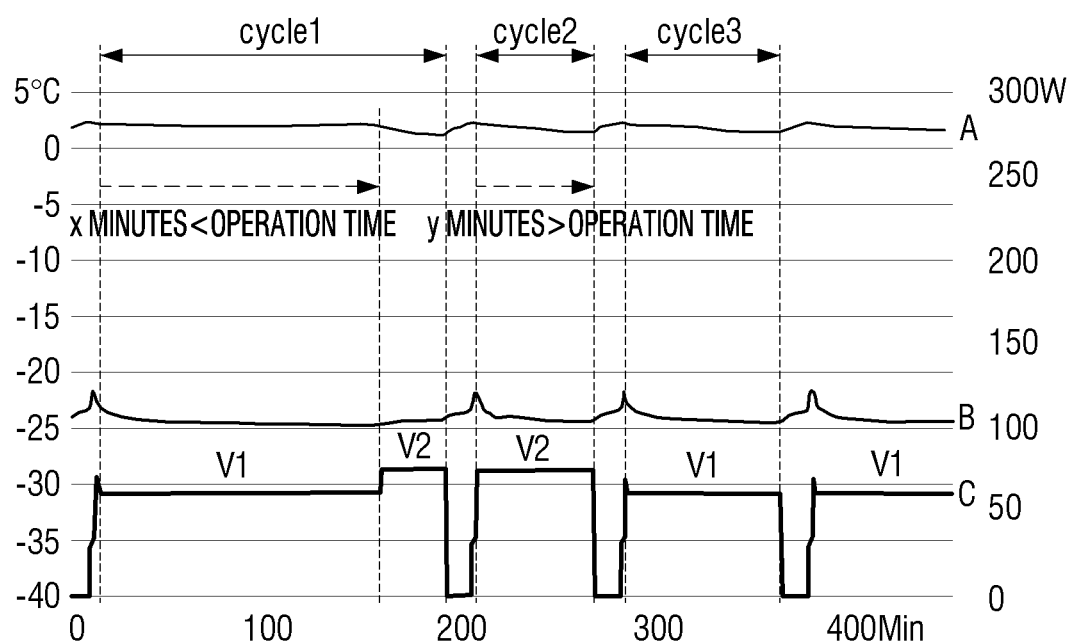
FIG. 3 is a diagram for describing a method for determining an initial driving speed of a motor in a subsequent cycle according to a first embodiment.
Figure 4:
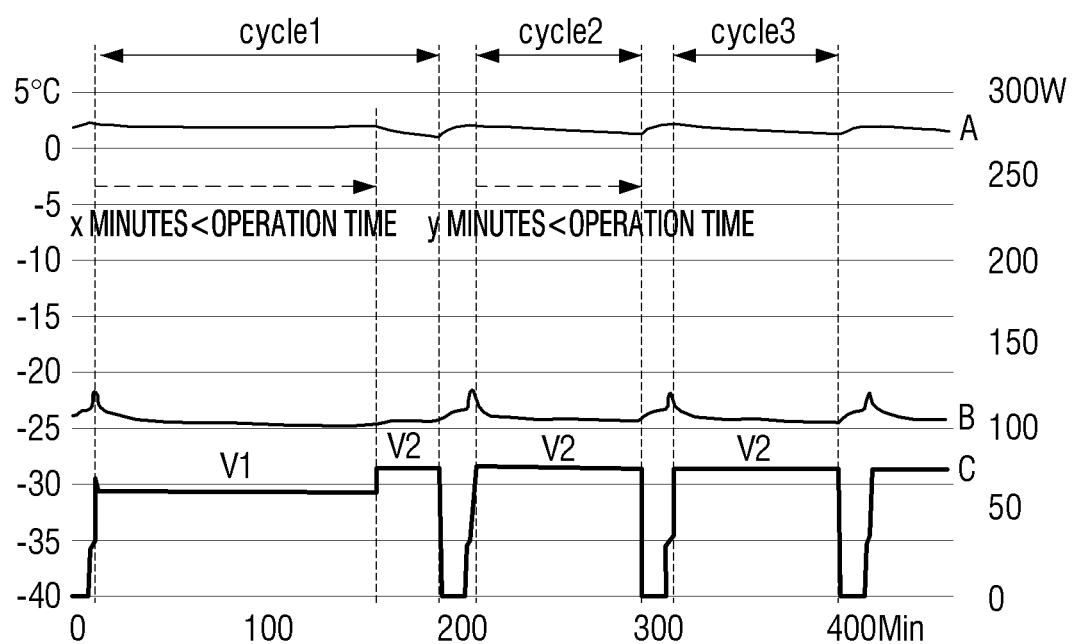
FIG. 4 is a diagram for describing the method for determining an initial driving speed of the motor in a subsequent cycle according to the first embodiment.

FIGS. 3 and 4 are diagrams for describing a method for determining an initial driving speed of the motor in a subsequent cycle according to a first embodiment.

A temperature A in the refrigerator compartment 160-1, a temperature B in the freezer compartment 160-2, and a driving speed C of the motor 120 over time are shown in FIGS. 3 and 4. Further, referring to FIGS. 3 and 4, it may be identified that the motor 120 performs the operation for a plurality of cycles (Cycle 1, Cycle 2, and Cycle 3).

First, referring to FIG. 3, it may be identified that the motor 120 is operated at the driving speed V1 corresponding to low RPM in Cycle 1, but the temperature A or B in the refrigerator 100 does not reach the target temperature within an appropriate operation time (x minutes) which results in the cooling delay situation, and then the motor 120 is operated at the driving speed V2 higher than the driving speed V1.

As in the above description of the operation of the processor 150, the processor 150 may determine an initial driving speed of the motor in the subsequent cycle depending on whether or not the cooling delay situation occurs in the previous cycle, based on the operation information of the motor 120 in the previous cycle.

Therefore, the processor 150 may determine the driving speed V2 higher than the driving speed V1 as the initial driving speed in the subsequent cycle (Cycle 2) because the cooling delay situation occurs in the previous cycle (Cycle 1). Further, the processor 150 may control the motor 120 to be operated at the driving speed V2, and may end the operation of the motor 120 once the temperature in the refrigerator 100 reaches the target temperature.

The processor 150 may determine an initial driving speed of the motor in the subsequent cycle (Cycle 3) depending on whether or not the cooling delay situation occurs in the previous cycle, based on the operation information of the motor 120 in the previous cycle (Cycle 2).

Referring to FIG. 3, it may be identified that the motor 120 is operated at the driving speed V2 in the previous cycle (Cycle 2), and the temperature A or B in the refrigerator 100 reaches the target temperature within an appropriate operation time (y minutes) corresponding to the driving speed V2, and as a result, the cooling delay situation does not occur. In this case, the processor 150 may determine the driving speed V1 corresponding to low RPM as the initial driving speed of the motor in the subsequent cycle (Cycle 3) to save energy.

Meanwhile, referring to FIG. 4, it may be identified that the motor 120 is operated at the driving speed V2 in the previous cycle (Cycle 2), and the temperature A or B in the refrigerator 100 does not reach the target temperature within the appropriate operation time (y minutes) corresponding to the driving speed V2, and as a result, the cooling delay situation occurs. In this case, the processor 150 may determine the driving speed V2 as the initial driving speed of the motor in the subsequent cycle (Cycle 3) to prevent the cooling delay situation from occurring again.

Meanwhile, although the case that the processor identifies whether or not the cooling delay situation occurs depending on whether or not the temperature A in the refrigerator compartment or the temperature B in the freezer compartment reaches the target temperature within an appropriate operation time has been illustrated in FIGS. 3 and 4 and described, the processor may identify whether or not the cooling delay situation occurs based on only the temperature A in the refrigerator compartment in case that the motor only performs a refrigerator compartment cooling function, and the processor may identify whether or not the cooling delay situation occurs based on only the temperature B in the freezer compartment in case that the motor only performs a freezer compartment cooling function, at the time of actually implementing the refrigerator.

Figure 5:
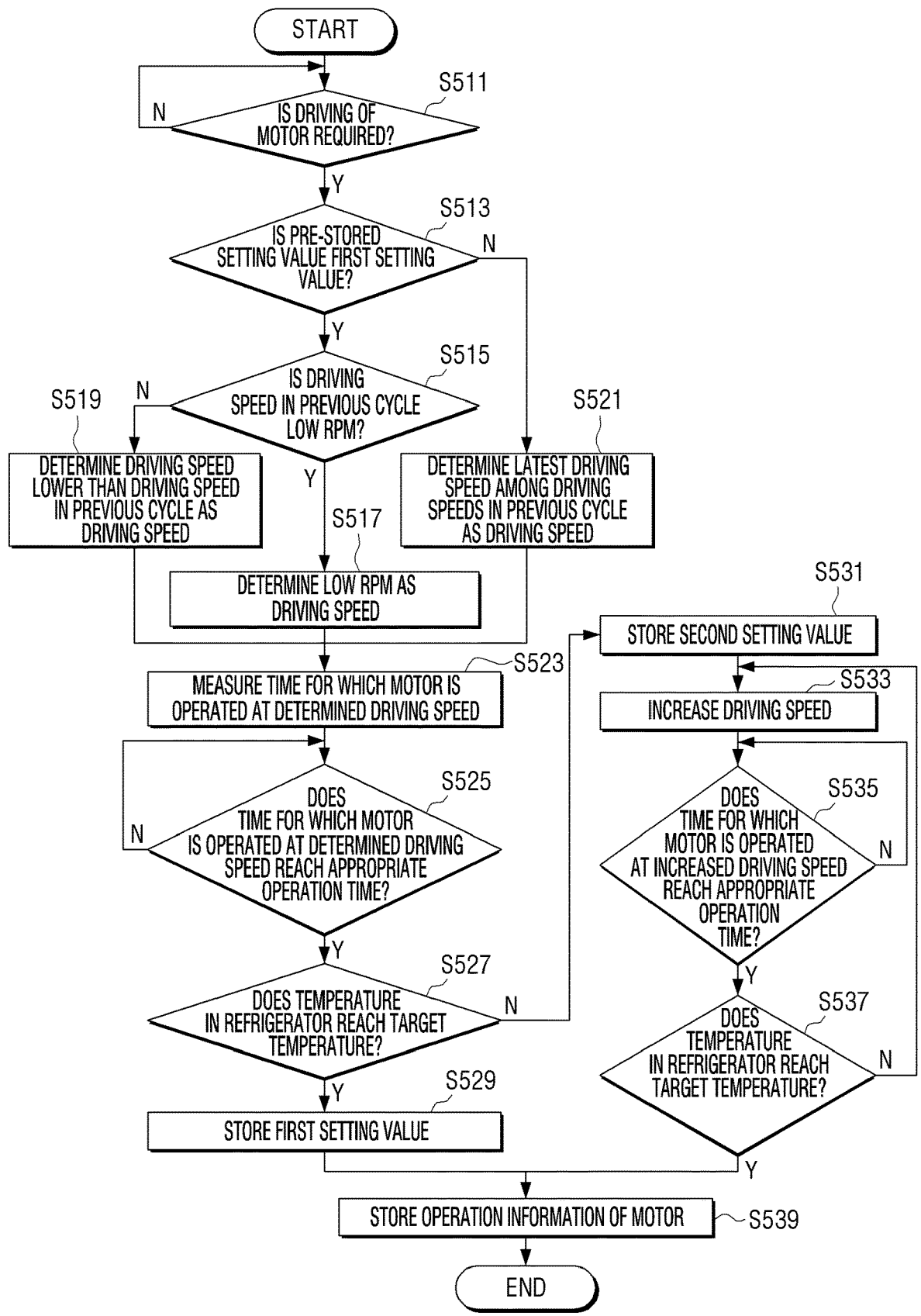
FIG. 5 is a flowchart for describing a method for determining an initial driving speed of the motor in a subsequent cycle according to a second embodiment.

FIG. 5 is a flowchart for describing a method for determining an initial driving speed of the motor in a subsequent cycle according to a second embodiment.

Referring to FIG. 5, the processor 150 may determine the initial driving speed of the motor in the subsequent cycle by using a method different from the method for determining an initial driving speed of the motor in a subsequent cycle described above.

Specifically, the processor 150 may store operation information of the motor 120 in the memory 130 while controlling the operation of the motor 120, change a setting value pre-stored in the memory 130 depending on whether or not the cooling delay situation occurs, and determine the driving speed in the subsequent cycle by using the pre-stored setting value and the operation information of the motor 120 in the previous cycle.

Here, the pre-stored setting value means a value indicating whether or not the cooling delay situation occurs in the previous cycle.

Hereinafter, a specific method for determining the driving speed in the subsequent cycle by using the pre-stored setting value and the operation information of the motor 120 in the previous cycle will be described.

First, the processor 150 may identify whether or not driving of the motor 120 for injecting the cooling air into the refrigerator is required (S511).

In case that it is identified that the driving is required (S511—Y), the processor 150 may identify whether or not the pre-stored setting value is a first setting value (S513). Here, the pre-stored setting value may be the first setting value or a second setting value. The first setting value means that the cooling delay situation does not occur during the operation in the previous cycle, and the second setting value means that the cooling delay situation occurs in the previous cycle.

In case that the pre-stored setting value is the first setting value (S513—Y), the processor 150 may identify whether or not the driving speed in the previous cycle is a driving speed corresponding to low RPM (S515).

In case that the driving speed in the previous cycle is the driving speed corresponding to low RPM (S515—Y), the cooling delay situation does not occur even in case of the operation of the motor 120 at low RPM, and thus the processor 150 may determine the driving speed corresponding to low RPM as the driving speed in the subsequent cycle (S517).

On the contrary, in case that the driving speed in the previous cycle is not the driving speed corresponding to low RPM (S515—N), the processor 150 may determine a driving speed lower than the driving speed in the previous cycle as the driving speed in the subsequent cycle (S519).

For example, in case that the driving speed in the previous cycle is the driving speed V2 one step higher than the driving speed V1 corresponding to low RPM, the processor 150 may determine the driving speed V1 corresponding to low RPM one step lower than the driving speed V2 as the initial driving speed in the subsequent cycle to save energy.

As another example, in case that the driving speed in the previous cycle is a driving speed V3 two steps higher than the driving speed V1 corresponding to low RPM, the processor 150 may determine the driving speed V2 one step lower than the driving speed V3 as the initial driving speed in the subsequent cycle to save energy.

On the contrary, in case that the pre-stored setting value is not the first setting value (S513—N), which means that the cooling delay situation occurs in the previous cycle, the processor 150 may determine the latest driving speed among driving speeds in the previous cycle as the driving speed in the subsequent cycle (S521).

For example, in case that the motor 120 is operated at the driving speed V1 corresponding to low RPM and then is operated at the driving speed V2 one step higher than the driving speed V1 in the previous cycle, the processor 150 may determine the driving speed V2 that is the latest driving speed as the initial driving speed in the subsequent cycle to prevent the cooling delay situation from occurring again.

As another example, in case that the motor 120 is operated at the driving speed V1 corresponding to low RPM, operated at the driving speed V2 one step higher than the driving speed V1, and then operated at the driving speed V3 two steps higher than the driving speed V1 in the previous cycle, the processor 150 may determine the driving speed V3 that is the latest driving speed as the initial driving speed in the subsequent cycle to prevent the cooling delay situation from occurring again.

Further, the processor 150 may control the motor 120 to be operated at the determined driving speed and measure a time for which the motor 120 is operated at the determined driving speed (S523). Then, the processor 150 may identify whether or not the time for which the motor 120 is operated at the determined driving speed reaches an appropriate operation time corresponding to the determined driving speed (S525).

In case that the time for which the motor 120 is operated at the determined driving speed reaches the appropriate operation time (S525—Y), the processor 150 may identify whether or not temperature in the refrigerator 100 reaches the target temperature (S527).

In case that the temperature in the refrigerator 100 reaches the target temperature (S527—Y), the processor 150 may change the pre-stored setting value to the first setting value (S529) because the cooling delay situation does not occur. Then, the processor 150 may store the operation information of the motor 120 and end the operation of the motor 120 (S539).

On the contrary, in case that the temperature in the refrigerator 100 does not reach the target temperature (S527—N), which means that the cooling delay situation occurs, the processor 150 may change the pre-stored setting value to the second setting value (S531). Then, the processor 150 may increase the driving speed of the motor 120 to a driving speed by one step (S533).

Then, the processor 150 may identify whether or not the time for which the motor 120 is operated at the increased driving speed reaches an appropriate operation time corresponding to the increased driving speed (S535). In case that the time for which the motor 120 is operated at the increased driving speed reaches the appropriate operation time (S535-Y), the processor 150 may identify whether or not temperature in the refrigerator 100 reaches the target temperature (S537).

In case that the temperature in the refrigerator 100 reaches the target temperature (S537—Y), the processor 150 may store the operation information of the motor 120 and end the operation of the motor 120 (S539).

On the contrary, in case that the temperature in the refrigerator 100 does not reach the target temperature (S537—N), which means that the cooling delay situation occurs again, the processor 150 may increase the driving speed of the motor 120 by one step (S533).

As such, the processor 150 may determine the initial driving speed in the subsequent cycle by using the pre-stored setting value indicating whether or not the cooling delay situation occurs in the previous cycle, and the operation information in the previous cycle.

Figure 6:
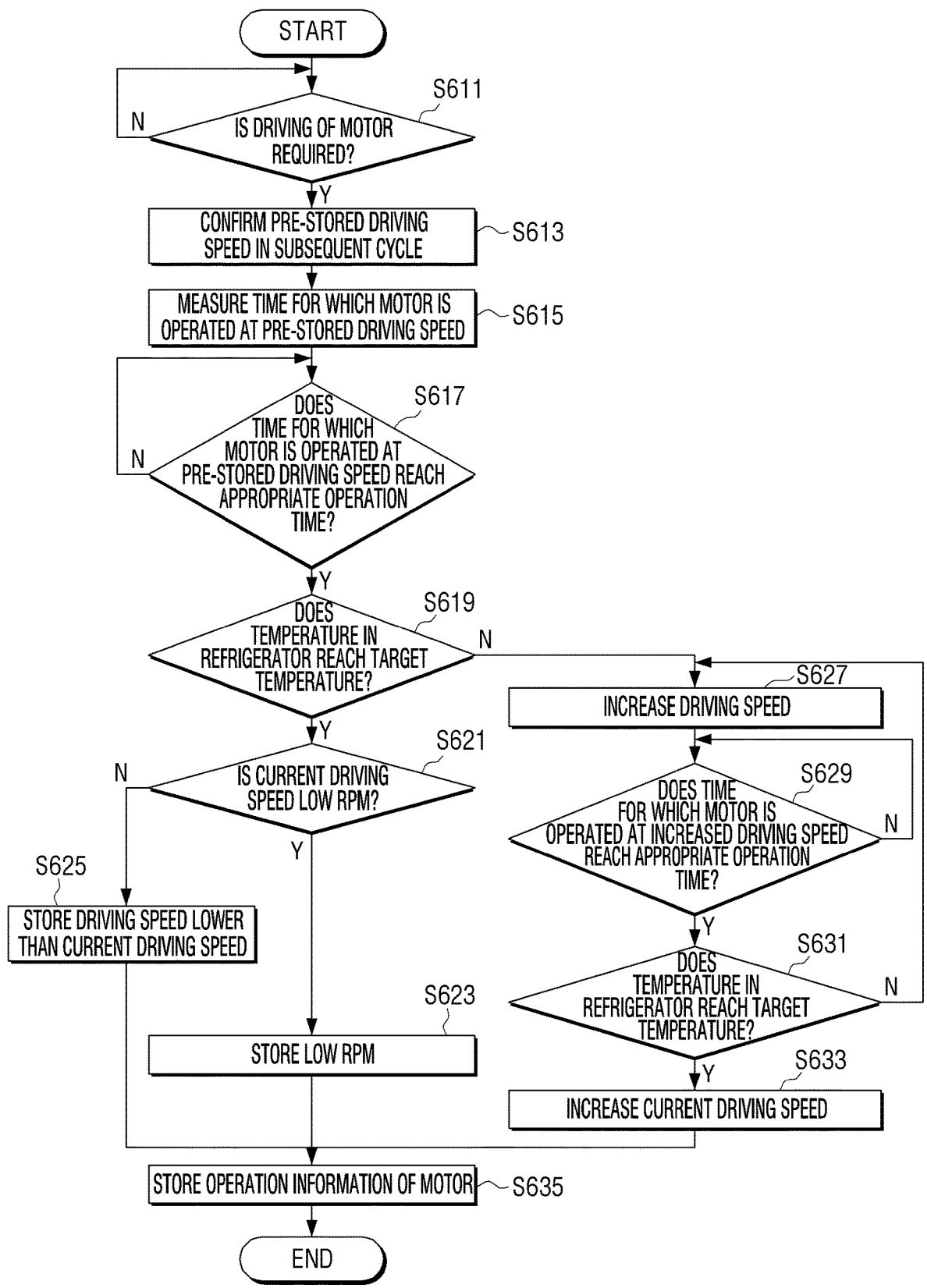
FIG. 6 is a flowchart for describing a method for determining an initial driving speed of a motor in a subsequent cycle according to a third embodiment.

FIG. 6 is a flowchart for describing a method for determining an initial driving speed of the motor in a subsequent cycle according to a third embodiment.

The processor 150 may determine the initial driving speed of the motor in the subsequent cycle by using a method different from the method for determining an initial driving speed of the motor in a subsequent cycle described above.

Specifically, the processor 150 may store operation information of the motor 120 in the memory 130 while controlling the operation of the motor 120, determine the driving speed in the subsequent cycle depending on whether or not the cooling delay situation occurs and store the determined driving speed in the memory 130 in advance, and control the operation of the motor 120 in the subsequent cycle based on the pre-stored driving speed.

Hereinafter, a specific method for determining the driving speed in the subsequent cycle in advance while controlling the operation of the motor 120 will be described.

First, the processor 150 may identify whether or not driving of the motor 120 for injecting the cooling air into the refrigerator is required (S611).

In case that it is identified that the driving is required (S611—Y), the processor 150 may confirm the pre-stored driving speed in the subsequent cycle (S613). Further, the processor 150 may control the motor 120 to be operated at the pre-stored driving speed and measure a time for which the motor 120 is operated at the pre-stored driving speed (S615).

Then, the processor 150 may identify whether or not the time for which the motor 120 is operated at the pre-stored driving speed reaches an appropriate operation time corresponding to the pre-stored driving speed (S617).

In case that the time for which the motor 120 is operated at the pre-stored driving speed reaches the appropriate operation time (S617—Y), the processor 150 may identify whether or not temperature in the refrigerator 100 reaches the target temperature (S619).

In case that the temperature in the refrigerator 100 reaches the target temperature (S619—Y), the processor 150 may determine the driving speed in the subsequent cycle in advance based on the current driving speed at which the motor 120 is operated, because the cooling delay situation does not occur.

Specifically, the processor 150 may identify whether or not the current driving speed at which the motor 120 is operated is the driving speed corresponding to low RPM (S621).

In case that the current driving speed at which the motor 120 is operated is the driving speed corresponding to low RPM (S621—Y), the processor 150 may store the driving speed corresponding to low RPM as the driving speed in the subsequent cycle (S623). Then, the processor 150 may store the operation information of the motor 120 and end the operation of the motor 120 (S635).

On the contrary, in case that the current driving speed at which the motor 120 is operated is not the driving speed corresponding to low RPM (S621—N), the processor 150 may store a driving speed one step lower than the current driving speed at which the motor 120 is operated as the driving speed in the subsequent cycle to save energy (S625). Then, the processor 150 may store the operation information of the motor 120 and end the operation of the motor 120 (S635).

On the contrary, in case that the temperature in the refrigerator 100 does not reach the target temperature (S619—N), which means that the cooling delay situation occurs, the processor 150 may increase the driving speed of the motor 120 by one step (S627).

Then, the processor 150 may identify whether or not the time for which the motor 120 is operated at the increased driving speed reaches an appropriate operation time corresponding to the increased driving speed (S629). In case that the time for which the motor 120 is operated at the pre-stored driving speed reaches the appropriate operation time (S629-Y), the processor 150 may identify whether or not temperature in the refrigerator 100 reaches the target temperature (S631).

In case that the temperature in the refrigerator 100 reaches the target temperature (S631—Y), the processor 150 may store the current driving speed at which the motor 120 is operated as the driving speed in the subsequent cycle (S633). Then, the processor 150 may store the operation information of the motor 120 and end the operation of the motor 120 (S635).

On the contrary, in case that the temperature in the refrigerator 100 does not reach the target temperature (S631—N), which means that the cooling delay situation occurs, the processor 150 may increase the driving speed of the motor 120 by one step (S627).

As such, the processor may determine the initial driving speed in the subsequent cycle in advance depending on whether or not the cooling delay situation occurs during the operation of the motor in a specific cycle.

Figure 7:
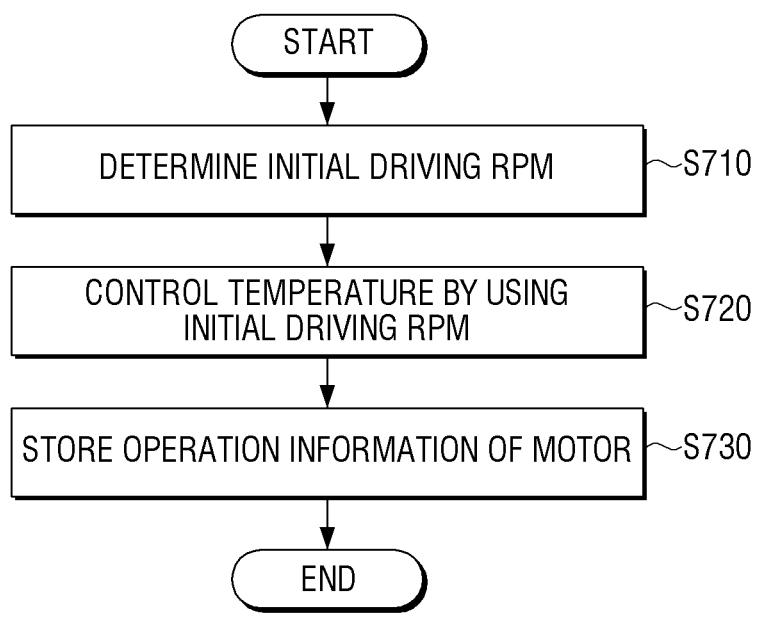
FIG. 7 is a flowchart for describing a method for controlling a refrigerator according to an embodiment of the disclosure.

FIG. 7 is a flowchart for describing a method for controlling a refrigerator according to an embodiment of the disclosure.

Referring to FIG. 7, first, an initial driving speed for driving of the motor is determined (S710). Specifically, the initial driving speed may be determined based on operation information of the motor stored during the operation of the motor in the previous cycle.

More specifically, in case that the motor is operated at a predetermined first driving speed and the control of temperature in the refrigerator is performed within a predetermined first time during the operation of the motor in the previous cycle, the predetermined first driving speed may be determined as the initial driving speed. On the contrary, in case that the motor is operated at the predetermined first driving speed, but the control of temperature in the refrigerator is not performed within the predetermined first time, a predetermined second driving speed higher than the predetermined first driving speed may be determined as the initial driving speed.

Here, the predetermined first driving speed means a driving speed corresponding to low RPM for energy saving. Further, the predetermined first driving speed may be set based on at least one of the temperature in the refrigerator, the ambient temperature of the refrigerator, or the user command.

The predetermined first time is an appropriate operation time corresponding to the predetermined first driving speed and may mean a time estimated to be required for the temperature in the refrigerator to reach the target temperature in case that the motor is operated at the predetermined first driving speed.

That is, the initial driving speed of the motor in the subsequent cycle may vary depending on whether or not the cooling delay situation occurs during the operation of the motor at the predetermined first driving speed corresponding to low RPM in the previous cycle.

Meanwhile, the motor may also be operated at a driving speed higher than the driving speed corresponding to low RPM in the previous cycle. Also in this case, the initial driving speed of the motor in the subsequent cycle may be determined based on the driving speed of the motor in the previous cycle.

Specifically, in case that the motor is operated at the predetermined second driving speed higher than the predetermined first driving speed and the control of temperature in the refrigerator is performed within a predetermined second time during the operation in the previous cycle, the predetermined first driving speed may be determined as the initial driving speed. On the contrary, in case that the motor is operated at the predetermined second driving speed, but the control of temperature in the refrigerator is not performed within the predetermined second time, the predetermined second driving speed may be determined as the initial driving speed.

Here, the predetermined second time is an appropriate operation time corresponding to the predetermined second driving speed and may mean a time estimated to be required for the temperature in the refrigerator to reach the target temperature in case that the motor is operated at the predetermined second driving speed.

That is, the initial driving speed of the motor in the subsequent cycle may vary depending on whether or not the cooling delay situation occurs during the operation of the motor at the predetermined second driving speed higher than the driving speed corresponding to low RPM in the previous cycle.

Then, the control of temperature in the refrigerator is performed by using the determined initial driving speed (S720). Specifically, the motor may be controlled to be operated at the determined initial driving speed to inject the cooling air into the refrigerator, thereby controlling the temperature in the refrigerator.

Further, the driving speed of the motor may be increased in case that the motor is operated at the determined initial driving speed, but the temperature in the refrigerator is not controlled within the appropriate operation time corresponding to the determined initial driving speed.

Specifically, in case that the motor is operated at the determined initial driving speed, but the temperature in the refrigerator does not reach the target temperature within the appropriate operation time corresponding to the determined initial driving speed, the driving speed of the motor may be increased.

Further, in case that the motor is controlled to be operated at the increased driving speed, but the temperature in the refrigerator does not reach the target temperature within an appropriate operation time corresponding to the increased driving speed, the driving speed of the motor may be increased again.

Further, the operation of the motor may end once the temperature in the refrigerator reaches the target temperature.

Then, operation information of the motor in the control of temperature process is stored (S730). Specifically, the operation information may include information regarding a driving speed of the motor in each cycle in the control of temperature process. Further, the operation information of the motor may further include information regarding a time for which the motor is operated at each driving speed.

Meanwhile, whether or not driving of the motor 120 for injecting the cooling air into the refrigerator is required may be identified before determining the initial driving RPM. Here, the point in time at which driving of the motor is required means a point in time at which cooling air is injected into the refrigerator by operating the motor to allow the temperature in the refrigerator to be kept at the target temperature.

Specifically, the point in time at which driving is required may be a point in time at which the temperature in the refrigerator reaches a predetermined temperature. Once the temperature in the refrigerator reaches the predetermined temperature, it is determined that the temperature in the refrigerator is increased and injection of cooling air into the refrigerator is required.

Further, the point in time at which driving of the motor is required may correspond to a point in time at which a predetermined period elapses after the previous cycle of the motor ends. The predetermined period means a time estimated to be required for the temperature in the refrigerator to be increased to reach a temperature that requires the injection of cooling air into the refrigerator due to the end of the operation of the motor.

Therefore, in the method for controlling a refrigerator according to the disclosure, the initial driving speed in the subsequent cycle is determined by using the operation information of the motor in the previous cycle of the motor, such that it is possible to achieve both the effect of saving energy and the effect of preventing the cooling delay situation. The method for controlling a refrigerator as illustrated in FIG. 7 may be executed even for the refrigerator having the configuration illustrated in FIG. 1 or 2 or be executed even for a refrigerator having a configuration other than that of FIG. 1 or 2.

Further, the method for controlling a refrigerator described above may be implemented by at least one executable program for executing the method for controlling a refrigerator described above, and such an executable program may be stored in a non-transitory computer readable medium.

The non-transitory computer readable medium is not a medium that stores data therein for a while, such as a register, a cache, a memory, or the like, but means a medium that semi-permanently stores data therein and is readable by a device. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

What is claimed is:

1. A method for controlling a refrigerator including a motor driving a compressor, the method comprising:
   identifying driving revolutions per minute (RPM) for driving of the motor for a cycle including a start of a driving operation and a stop of the driving operation of the motor;
   performing a control of temperature in the refrigerator by driving the motor at the identified driving RPM; and
   storing operation information of the motor associated with the performing of the control of temperature,
   wherein the identifying of the driving RPM comprises:
      identifying stored operation information of the motor associated with a previous cycle of the driving operation of the motor,
      identifying a first driving speed as the driving RPM based on an occurrence of performing the control of temperature in the refrigerator at the first driving speed within a first time in the previous cycle of the driving operation of the motor, and
      identifying a second driving speed higher than the first driving speed as the driving RPM based on no occurrence of the performing of the control of temperature in the refrigerator at the first driving speed within the first time in the previous cycle of the driving operation of the motor,
      wherein the first driving speed is set based on the temperature in the refrigerator and an ambient temperature outside of the refrigerator.

2. The method as claimed in claim 1, wherein the identifying of the driving RPM for the cycle of the driving operation of the motor comprises:
   identifying the first driving speed as the driving RPM based on an occurrence of performing the control of temperature in the refrigerator at the second driving speed within a second time in the previous cycle of the driving operation of the motor, and
   identifying the second driving speed as the driving RPM based on no occurrence of the performing of the control of temperature in the refrigerator at the second driving speed within the second time in the previous cycle of the driving operation of the motor.

3. The method as claimed in claim 1, wherein the first driving speed is set further based on a user command.

4. The method as claimed in claim 1, further comprising determining whether the driving of the motor is required for injection of cooling air into the refrigerator,
   wherein the identifying of the driving RPM involves identifying the driving RPM based on determining that the driving of the motor is required.

5. The method as claimed in claim 4, wherein the determining of whether the driving of the motor is required comprises:
   identifying at least one of whether the temperature in the refrigerator is a predetermined temperature or whether a predetermined period elapses after the previous cycle of the driving operation of the motor.

6. The method as claimed in claim 1, wherein the performing of the control of temperature comprises:
   increasing the driving RPM of the motor based on no occurrence of the performing of the control of temperature in the refrigerator at the identified driving RPM speed within a time corresponding to the identified driving RPM.

7. A refrigerator comprising:
   a temperature sensor configured to sense a temperature in the refrigerator;
   a compressor configured to compress a refrigerant;
   a motor configured to drive the compressor;
   a memory configured to store operation information of the motor; and
   a processor configured to:
      identify driving RPM for driving of the motor for a cycle of including a start of a driving operation and a stop of motor driving operation of the motor,
      perform a control of temperature in the refrigerator by driving the motor at the identified driving RPM, and
      store the operation information of the motor associated with a process of the control of temperature in the memory,
   wherein the processor is further configured to:
      identify the driving RPM based on stored operation information of the motor associated with a previous cycle of the driving operation of the motor,
      identify a first driving speed as the driving RPM based on an occurrence of performing the control of temperature in the refrigerator at the first driving speed, within a first time in the previous cycle of the driving operation of the motor, and
      identify a second driving speed higher than the first driving speed as the initial driving RPM based on no occurrence of the performing of the control of temperature in the refrigerator at the first driving speed within the first time in the previous cycle of the driving operation of the motor,
      wherein the first driving speed is set based on the temperature in the refrigerator and an ambient temperature outside of the refrigerator.

8. The refrigerator as claimed in claim 7, wherein the processor is configured to:
   identify the first driving speed as the driving RPM based on an occurrence of the performing of the control of temperature in the refrigerator at the second driving speed within a second time in the previous cycle of the driving operation of the motor, and identify the second driving speed as the driving RPM based on no occurrence of the performing of the control of temperature in the refrigerator at the second driving speed within the second time in the previous cycle of the driving operation of the motor.

9. The refrigerator as claimed in claim 7, wherein the first driving speed is set further based on a user command.

10. The refrigerator as claimed in claim 7, wherein the processor is configured to determine whether the driving of the motor is required for injection of cooling air into the refrigerator, wherein the driving RPM is identified based on determining that the driving of the motor is required.

11. The refrigerator as claimed in claim 10, wherein the processor is configured to:

determine whether the driving of the motor is required by identifying at least one of whether the temperature in the refrigerator is a predetermined temperature or whether a predetermined period elapses after the previous cycle of the driving operation of the motor.

12. The refrigerator as claimed in claim 7, wherein the processor is configured to:

increase the driving RPM of the motor based on no occurrence of the performing of the control of temperature in the refrigerator at the identified initial driving RPM within a time corresponding to the identified driving RPM.

* * * * *